United States Patent [19]

Olson

[11] Patent Number: 5,474,499
[45] Date of Patent: Dec. 12, 1995

[54] FLEXIBLE DRIVE SHAFT COUPLING

[75] Inventor: Stanley J. Olson, Newport, R.I.

[73] Assignee: The United States of America as represented by the Secretary of the Navy, Washington, D.C.

[21] Appl. No.: 89,915

[22] Filed: Jul. 12, 1993

[51] Int. Cl.⁶ .................. F16D 3/64; F16D 3/76
[52] U.S. Cl. ...................... 464/83; 464/89; 464/160
[58] Field of Search ................. 464/160, 89, 83, 464/76, 85; 277/212 FB, 212 C, 92

[56] References Cited

U.S. PATENT DOCUMENTS

| | | | |
|---|---|---|---|
| 3,345,831 | 10/1967 | Boole | 464/83 |
| 3,392,984 | 7/1968 | Reinsma et al. | 277/92 |
| 3,438,221 | 4/1969 | Paulsen | 464/76 |
| 3,848,431 | 11/1979 | Takahashi et al. | 464/89 |
| 3,940,947 | 3/1976 | Ahlen | 464/85 |
| 4,479,786 | 10/1984 | De Bisschop | 464/89 |
| 4,548,591 | 10/1985 | Haldric et al. | 464/160 |
| 4,551,115 | 11/1985 | Ferguson | 464/160 |
| 4,743,218 | 10/1988 | Aubrey et al. | 464/85 |
| 4,772,245 | 9/1988 | Readman et al. | 464/160 |
| 4,779,470 | 10/1988 | Morita et al. | 464/76 |
| 4,795,402 | 1/1989 | Reichardt | 464/76 |
| 4,861,313 | 8/1989 | Zeiser et al. | 464/89 |
| 5,168,774 | 12/1992 | Andrä et al. | 464/89 |
| 5,224,898 | 7/1993 | Johnson et al. | 464/83 |
| 5,252,028 | 10/1993 | LoBoslo et al. | 464/89 |

Primary Examiner—Daniel P. Stodola
Assistant Examiner—Eileen A. Dunn
Attorney, Agent, or Firm—Michael J. McGowan; James M. Kasischke; Prithvi C. Lall

[57] ABSTRACT

A flexible drive shaft coupling with two stage torsional flexibility. The flexible drive shaft coupling allows axial, radial, and bending misalignment of the input and output shafts while vibrationally isolating the shafts from one another. At low torque, power is transmitted from the input shaft through an elastomeric ring to the output shaft. At higher torque the elastomeric ring is deformed to allow contact between a less resilient snubber assembly and a drive plate mechanically connected to the output shaft. Power is transmitted through less resilient snubber assemblies which provide for greater power transmission. The axis of the coupling can be provided with a flexible spool assembly to allow transmission of exhaust mass from the input shaft to the output shaft.

15 Claims, 5 Drawing Sheets

FLEXIBLE DRIVE SHAFT COUPLING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a flexible coupling for rotating shafts and particularly to a coupling which provides torsional, bending and axial flexibility and more particularly to a flexible coupling that provides two stage torsional flexibility.

(2) Description of the Prior Art

Flexible couplings are useful for connecting two rotating power transmission shafts which must bend or shorten. Many power transfer applications are also vibration and noise sensitive; accordingly, output vibrations or engine vibrations must be isolated from one another. Vibration isolation also reduces the transmission of noise to the outside environment through the drive shaft.

Many prior art universal joints are available which allow the transmission of power through a rotating shaft while allowing the shaft to bend. The most common type of universal joint has a yoke at the end of each shaft. Each yoke is pivotally joined to a web member allowing the shaft freedom of motion in one plane. The yokes are offset from each other at right angles to allow two degrees of freedom. The two yoke universal joint is not axially or torsionally flexible, and the standard universal joint does not provide a great deal of vibration isolation because it allows axial transmission of vibration through the shafts and the webbing.

Elastomeric flexible couplings are also known in the art. In these couplings power is transmitted through an elastomeric member attached between two shafts. The elastomeric member is positioned to allow transverse bending like the two yoke universal joint; however, the elastomeric universal joint also provides flexibility in response to torsional and axial forces, thereby isolating one shaft from vibrations transmitted by the other. A significant problem with elastomeric joints is the tendency of the elastomeric member to fail when subjected to high torque loading, transient vibrations or harsh environmental conditions. Accordingly, elastomeric couplings are used only in low torque, moderate temperature applications.

Selected power transmission machinery requires vibration isolation of the machinery's output shaft from the engine, motor, or other prime mover to prevent noise transmission from the engine to the output shaft environment. In special machinery applications, it is common to use the drive shaft to transmit exhaust gases because of space limitations, and couplings used in these applications should provide for mass transmission from one drive shaft to the other. The isolating member of the machinery should be flexible axially, torsionally and in bending to allow power to be transmitted through the shafting when either the input shaft or output shaft is displaced axially, torsionally or in bending.

Standard elastomeric couplings can provide the required axial and bending flexibility; however, these couplings will not withstand the strain of high torques when increased power transmission is necessary.

SUMMARY OF THE INVENTION

Accordingly, it is a general purpose and object of the present invention to provide a rotating shaft coupling with bending, rotational and axial flexibility.

It is a further object that such coupling avoid failure at high torque levels and at high temperatures.

Another object is that such coupling allow transmission of combustion products and fluids through the center of the coupling.

These objects are accomplished with the present invention by providing a flexible drive shaft coupling with two stage torsional flexibility. The flexible drive shaft coupling allows axial and radial misalignment of the input and output shafts while vibrationally isolating the shafts from one another. At low torques, power is transmitted from the input shaft through an elastomeric ring to the output shaft. At higher torques the elastomeric ring is deformed to allow contact between a less resilient snubber assembly and a drive plate mechanically connected to the output shaft. After this deformation, power is transmitted through the less resilient snubber assemblies which allow for greater power transmission. The axis of the coupling can be provided with a spool assembly to allow transmission of exhaust mass from the input shaft to the output shaft.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENTS

In the following description, the direction toward the engine shall be referred to hereinafter as forward, the direction away from the engine and toward the output shaft shall be referred to as aft. Inner shall refer to the direction radially closer to the axis of the assembly and outer shall refer to the direction radially away from the same axis.

Figure 1:
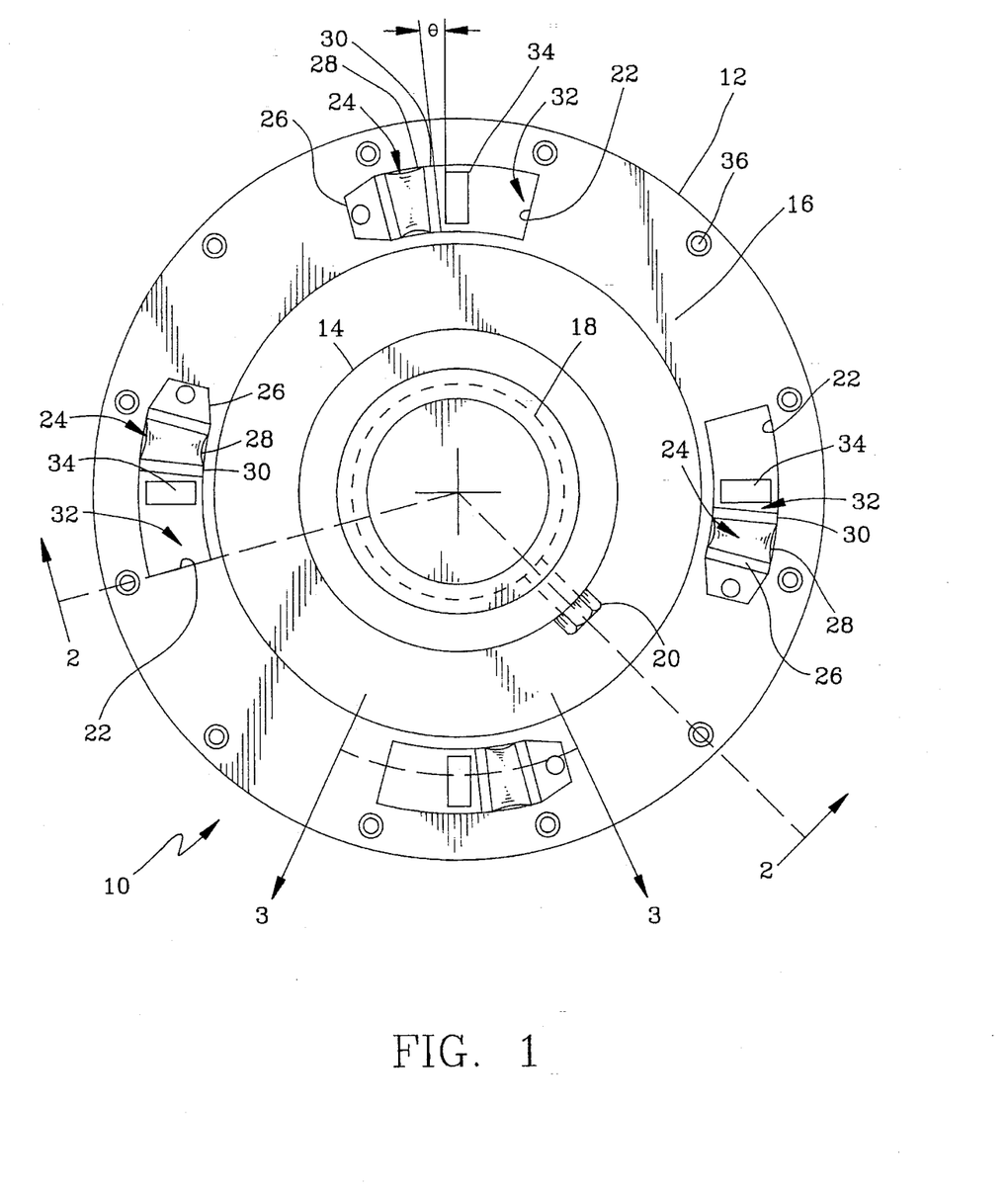
FIG. 1 shows an axial plan view of the flexible coupling as seen from the forward face of the coupling.

Referring now to FIG. 1 there is shown a plan view of a flexible drive shaft coupling 10 of the current invention as seen from its forward end. An input drive flange 12 is shown having a hollow cylindrical shaft collar 14 and a radially extending flange portion 16. Collar 14 has an internal splined surface 18 for mating with external splines on a drive shaft (not shown) to allow transmission of torque. A set screw 20 extends through an aperture in collar 14 to axially attach collar 14 to a drive shaft. Flange portion 16 has four circumferentially spaced apart, arcuate rotational gaps 22 therein. Rotational gaps 22 are curved with respect to the axis of coupling 10. Snubber assemblies 24 are affixed to the forward surface of flange portion 16 and extend circumferentially into each rotational gap 22. Each snubber assembly 24 comprises a mounting bracket 26, an elastomeric pad 28, and a contact plate 30. Mounting bracket 26 and contact plate 30 are made from aluminum; however, they can be made from other conventional rigid materials such as steel, titanium or high strength composites. Contact plate 30 is not essential to the operation of coupling 10, but it will prevent wear of elastomeric pad 28. Elastomeric pad 28 is made from a tough, stiff synthetic rubber such as Viton or Silicone but not limited to these materials. Visible through rotational gap 22 of FIG. 1 is a drive flange 32 and with integral drive fingers 34 extending into rotational gaps 22. A plurality of bolts 36 are disposed through apertures 38 in the forward face of flange portion 16 at the edge thereof. Snubber contact plate 30 and drive finger 34 are angularly separated by angle θ in normal operation.

Figure 2:
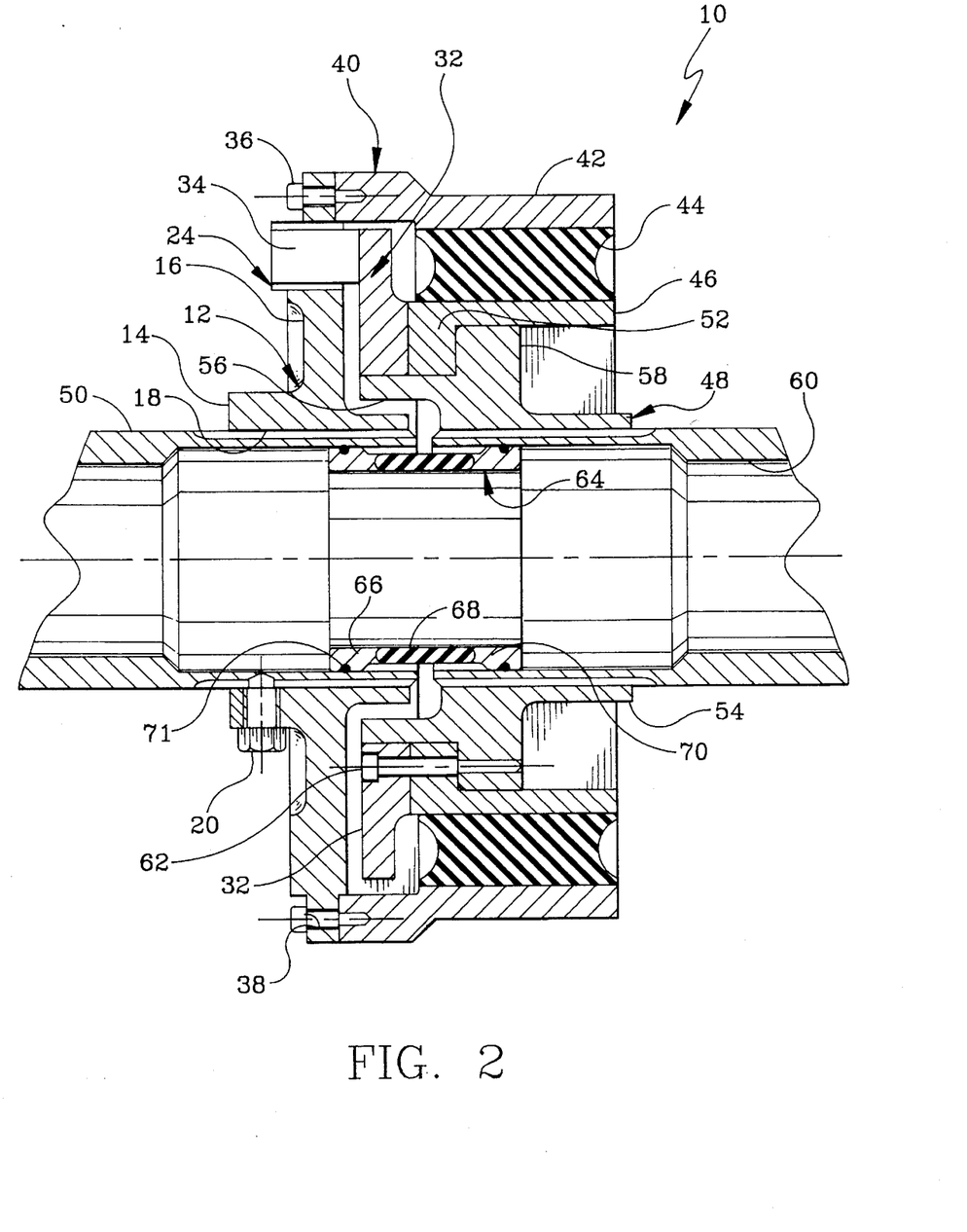
FIG. 2 shows a cross sectional view of a flexible drive shaft coupling of the current invention taken along line 2—2 of FIG. 1.

Referring now to FIG. 2 there is shown a cutaway view of the flexible drive shaft coupling along section 2—2 of FIG. 1. Flexible drive shaft coupling 10 comprises input drive flange 12, a bonded ring assembly 40 incorporating an outer ring 42, an elastomeric ring 44, and an inner ring 46. Drive flange 32 is shown disposed between ring assembly 40 and input drive flange 12. An output flange 48 is disposed concentrically within ring assembly 40.

Input drive flange 12 has a hollow, cylindrical shaft collar 14 with a flange portion 16 about collar 14. Flange portion 16 is positioned substantially between the forward and aft portions of collar 14. Input drive flange 12 is mounted on an engine drive shaft 50 by power transmitting means such as meshing involute splines located on the external surface of shaft 50 and the internal surface of collar 14. Drive flange 12 is retained axially by set screw 20 in a radial set screw aperture in collar 14. Flange portion 16 has a plurality of arcuate rotational gaps (shown in FIG. 1) extending therethrough parallel to the axis of flange 12. A snubber assembly 24 is mounted on the forward side of flange portion 14 at one edge of each rotational gap.

The outer aft surface of flange portion 16 is mounted to ring assembly 40 by bolts 36 extending through bolt apertures 38. Ring assembly 40 forms a hollow cylindrical body with elastomeric power transfer ring 44 bonded concentrically between outer ring 42 and inner ring 46. Power transfer ring 44 is made from a tough, high operating temperature elastomer preferably, but not limited to, Viton or Silicone. High pressure transfer molding techniques ensure optimum bonding at ring 44 surfaces; however, such techniques are not essential for operation of coupling 10. Inner ring 46 has an internal mounting flange 52 formed internally about the forward rim of inner ring 46 with mounting apertures extending through flange 52 parallel to the axis of ring 46. Ring assembly 40 acts to transmit the power from input drive flange 12 to output flange 48 while allowing bending, compression and axial misalignment.

Drive flange 32 is disk shaped with a central aperture. Drive flange 32 has a plurality of mounting apertures therethrough positioned to correspond with apertures in mounting flange 52. A plurality of drive fingers 34 formed integrally with drive flange 32 extend from the forward face of drive flange 32 generally parallel to the central axis of coupling 10. Each drive finger 34 is positioned to correspond with rotational gaps (not shown) in flange portion 16. (See FIG. 1.) When coupling 10 is assembled each finger 34 extends into each rotational gap to allow contact between corresponding snubber assembly 24 and finger 34 when elastomeric ring 44 is subjected to torsional loads causing angular deformation greater than θ.

Output flange 48 has a hollow, cylindrical output flange body 54 with the forward end of output flange body 54 having an integral mounting lip 56 with a greater inner diameter which extends forward from cylindrical body 54 and an integral mounting flange 58 disposed on cylindrical body 54. Mounting flange 58 has threaded apertures therein, axially parallel to the axis of coupling 10 and corresponding to apertures through drive flange 32 and internal mounting flange 52. Mounting flange 58 and lip 56 define a shoulder for axially and radially retaining drive flange 32 and inner ring 46. An output drive shaft 60 with splines on its outer surface is joined with meshing splines on the inner surface of cylindrical body 54.

Drive flange 32 is mounted to output flange 48 by bolts 62 extending through drive flange 32 mounting apertures, apertures in internal mounting flange 52, and joining output flange 48 mounting apertures. Input drive flange 12 is thereby positioned to nest within output flange lip 56 preserving clearance between drive flange 32, output flange 48, and input drive flange 12 to allow independent movement of input drive flange 12 and output flange 48. Clearance distance between flanges 12 and 48 must allow misalignment between engine drive shaft 50 and output drive shaft 60.

Input drive flange 12 and outer ring 42 can be made as one piece instead of two pieces as shown herein. Flange 12 and outer ring 42 are made as two pieces to allow for ease of maintenance and manufacture. Likewise, drive flange 32, inner ring 46, and output flange 48 can also be made integrally.

In this embodiment, engine drive shaft 50 and output drive shaft 60 are hollow to allow exhaust gasses to be passed through the combined shafts. An internal, isolating shaft spool assembly 64 is positioned within engine drive shaft 50 and output drive shaft 60 at their junction within coupling 10 to prevent exhaust products from escaping between shafts 50 and 60. Spool assembly 64 has a tight clearance fit within shafts 50 and 60. Shaft spool assembly 64 comprises forward spool section 66, elastomeric spool section 68, and aft spool section 70. Both forward spool section 66 and aft spool section 70 have annular grooves on the outer surface thereof to accommodate O-rings 71 to seal spool 64 against shafts 50 and 60. Elastomeric spool section 68 is bonded between forward spool section 66 and aft spool section 70 to create a longer, flexible, cylindrical assembly that will avoid interference with coupling 10.

Figure 3:
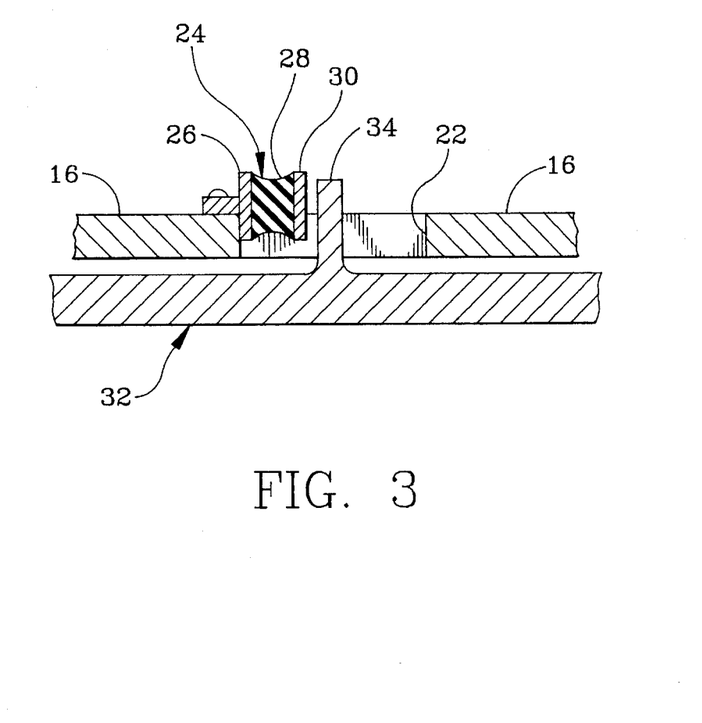
FIG. 3 shows a cutaway detail view of one snubber assembly on the flexible coupling taken along line 3—3 of FIG. 1.

Referring now to FIG. 3, there is shown a detail view of FIG. 1 cutaway on section 3—3. Snubber assembly 24 is mounted on the outer face of flange portion 16 with snubber assembly 24 extending partially across the face of rotational gap 22. The interior surface of rotational gap 22 can be coated with a slick polymer such as teflon to prevent friction between drive finger 34 and flange 16. Snubber assembly 24 comprises arcuate bracket 26 for affixing snubber assembly 24 to the face of flange portion 16. A snubber elastomer 28 preferably made from Viton or silicone but not limited to these elastomers is bonded to bracket 26. The surface of snubber 24 extending furthest into rotational gap 22 has rigid contact plate 30 bonded thereto. Contact plate 30 can be coated with a slick polymer such as teflon to prevent lateral friction with drive finger 34.

In operation, flexible drive shaft coupling 10 allows power to be transmitted from engine drive shaft 50 to output drive shaft 60. Torque enters coupling 10 through input drive flange 12. Input drive flange 12 transmits the torque-to outer ring 42. Outer ring 42 transmits torque to elastomeric ring 44. Elastomeric ring 44 is flexible to allow axial misalignment and compression while providing torsional damping. Inner ring 46 is bonded to elastomeric ring 44 to receive power therefrom and fixed to output flange 48 which transmits the power to output drive shaft 60.

At high power levels, coupling 10 uses a different method of power transmission. The torque transmitted through elastomeric ring 44 causes angular misalignment between input shaft 50 and output shaft 60. When the angular deformation becomes greater than angle θ between drive finger 34 and contact plate 30 then torque is transmitted from input drive shaft 50 through input drive flange 12 to snubber assembly 24. Snubber assembly 24 contacts drive finger 34 which then transmits the torque to drive flange 32 and thence to output flange 48. Elastomeric member 28 in snubber assembly 24 provides some damping for force transmitted from flange 12 to drive finger 34. Snubber assembly can be omitted if elastomeric damping is not required at high power levels. If snubber assembly 24 is omitted, drive finger 34 will contact flange 16 at the circumferential end of rotational gap 22.

Figure 4:
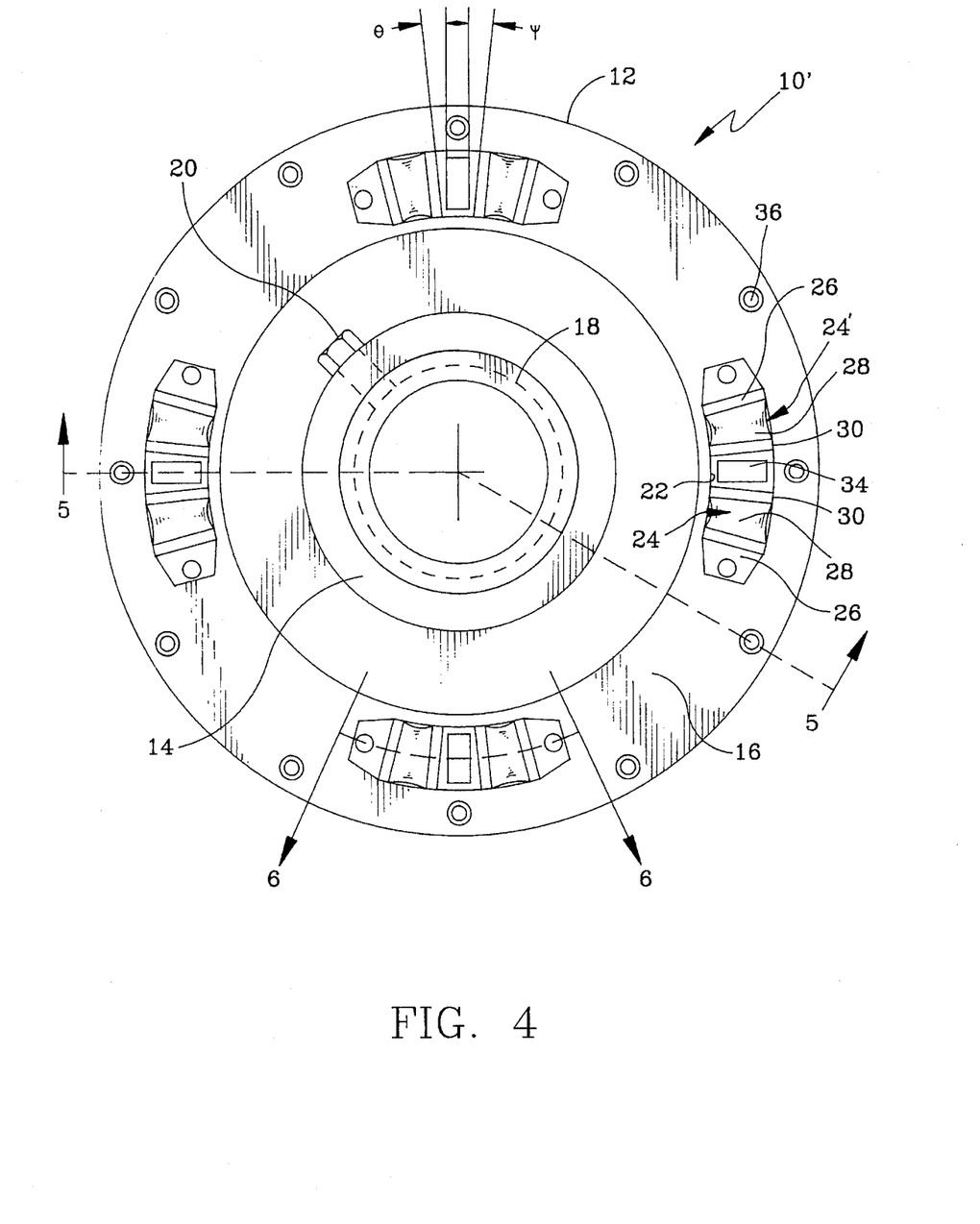
FIG. 4 shows an axial plan view of an alternate embodiment of the flexible coupling as seen from the forward face of the coupling.

In the embodiment of invention shown in FIG. 1, snubber assembly 24 is only effective to transmit torque when the shaft is operating in one direction. FIG. 4 shows an alternate embodiment of the inventive device having two snubber assemblies 24 and 24' extending into each arcuate angular gap 22. The presence of two snubber assemblies 24 and 24' for each angular gap 22 allows torque to be transmitted at high power levels independent of the direction of shaft rotation. In this embodiment Ψ represents the angular gap between finger 34 and added snubber assembly 24'.

Figure 5:
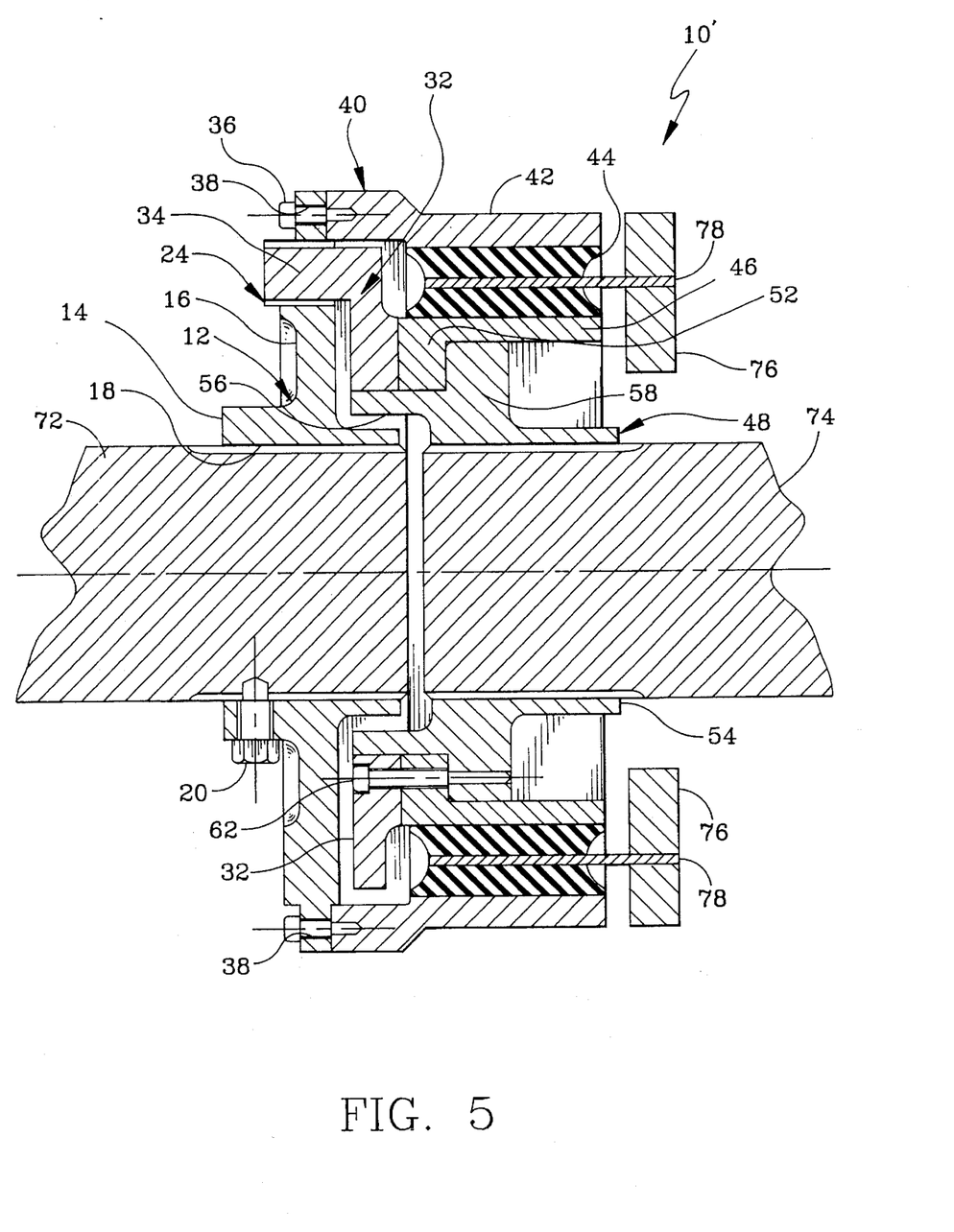
FIG. 5 shows a cross sectional view of another alternate embodiment of the coupling.

Referring now to FIG. 5 there is shown an alternate embodiment of the flexible drive shaft coupling 10 with solid drive shafts 72 and 74 and an intermediate mass assembly comprising an intermediate mass 76 and a mounting cylinder 78. In this embodiment, flexible drive shaft coupling 10' joins two solid shafts, engine drive shaft 72 and output drive shaft 74. The use of solid shafts obviates the need for shaft spool assembly, shown as 64 in FIG. 2. Shaft spool assembly can likewise be omitted if drive shaft combination is not used for gas transfer. The embodiment shown in FIG. 5 also incorporates an intermediate mass 76. A rigid intermediate mounting cylinder 78 is bonded between two layers of elastomeric ring 44 and 44' between outer ring 42 and inner ring 46. Intermediate mass 76 is a toroidal body mounted to intermediate mounting cylinder 78 and fitting around output drive shaft 74 on the aft side of coupling 10. Intermediate mass 76 provides rotational mass to change the torsional fundamental frequency of coupling 10' and thereby reduce transmitted vibration and noise. Obviously, an intermediate mass assembly such as that shown in FIG. 5 can be incorporated in an alternate embodiment of the invention having hollow shafts and a spool assembly like FIG. 2. Likewise, solid shafts can be incorporated in an embodiment of the invention lacking an intermediate mass assembly.

Figure 6:
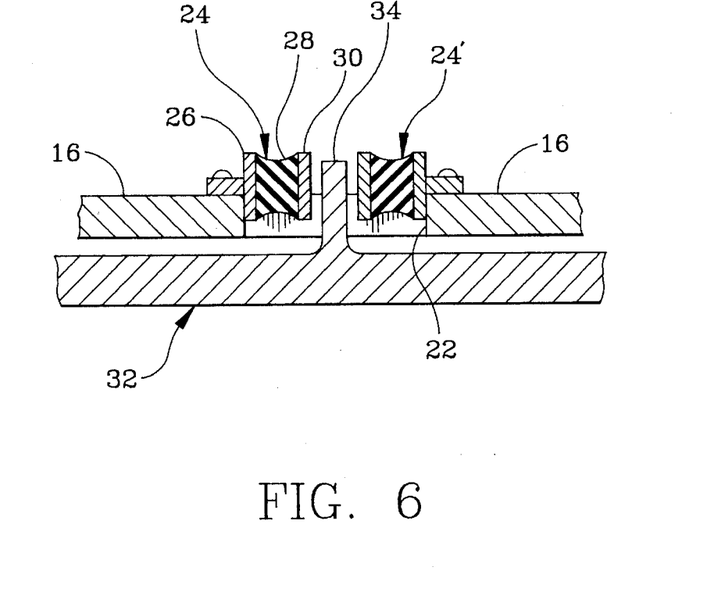
FIG. 6 shows a cutaway detail view of the snubber assemblies on the alternate embodiment of the flexible coupling taken along line 6—6 of FIG. 4.

In FIG. 6 there is shown a cutaway detail view of the snubber assemblies on the alternate embodiment of the flexible coupling taken along line 6—6 of FIG. 4. In this embodiment two snubber assemblies 24 and 24' are mounted on the outer face of flange portion 16 for each rotational gap 22. Each of these snubber assemblies 24 and 24' is essentially identical to those described in FIG. 3 above. The presence of the additional snubber assembly 24' allows bidirectional operation of coupling 10.

The advantages of the present invention over the prior art are that: the flexible coupling provides transmission of rotational energy while allowing the input and output shafts to move relative to each other axially, in bending, and in torsion thereby isolating one shaft from the other. The device provides two stage torsional flexibility by allowing power to be transmitted through the elastomeric ring at low power levels with a high level of isolation, and allowing power to be transmitted through the snubber assemblies at high power levels when isolation is less critical. The device provides significant advantages over prior art elastomeric couplings. First, it allows misalignment between two joined shafts and reduces noise caused by misalignment. Second, it provides two stage rotational isolation to provide greater isolation at low power levels. An added benefit of two stage isolation is tolerance of the coupling to elastomeric ring failure because of structural redundancy. Third, it provides for installation of an intermediate mass assembly to adjust the isolation of the coupling for different frequencies. Fourth, it provides for transmission of exhaust gasses or fluids through the center of the coupling.

What has thus been described is a flexible drive shaft coupling with two stage torsional flexibility. The flexible drive shaft coupling allows axial, radial, and bending misalignment of the input and output shafts while vibrationally isolating the shafts from one another. At low torque, power is transmitted from the input shaft through an elastomeric ring to the output shaft. At higher torque the elastomeric ring is deformed to allow contact between a less resilient snubber assembly and a drive plate mechanically connected to the output shaft. Power is transmitted through less resilient snubber assemblies which provide for greater power transmission.

Obviously many modifications and variations of the present invention may become apparent in light of the above teachings. For example: the snubber assemblies can be omitted allowing drive fingers to contact the ends of the angular gaps; the drive fingers or the angular gaps can be provided with elastomeric bumper strips to prevent metal to metal contact; as space allows, any number of angular gaps, snubber assemblies, and drive fingers can be provided; snubber assemblies can be made from rigid materials; a snubber assembly can be provided at each end of each angular gap to allow bidirectional, two stage, torsional flexibility; and an intermediate mass assembly can be provided to change the fundamental frequency of the coupling.

In light of the above, it is therefore understood that within the scope of the appended claims, the invention may be practiced otherwise than as specifically described.

What is claimed is:

1. A flexible drive shaft coupling for connecting an engine drive shaft to an output drive shaft comprising:

an input drive flange having a centrally located hollow collar portion with a disk shaped portion formed integrally thereabout, said collar portion accepting and joining with said engine drive shaft to accept power from said engine drive shaft, said disk shaped portion having a forward face, an aft face, and a plurality of arcuate angular gaps therethrough positioned about said disk shaped portion and extending through said disk shaped portion from said forward face to said aft face;

an elastomeric ring concentrically joined to said input drive flange;

an output drive flange having a centrally located hollow collar portion with a disk shaped portion formed integrally thereabout, and a plurality of drive fingers disposed on said output drive flange corresponding to said angular gaps in said input drive flange, said output drive flange fixed concentrically to said elastomeric ring, said output drive flange collar portion accepting and joining with said output drive shaft, said drive fingers extending through said angular gaps and contacting said input drive flange disk shaped portion when torque from said engine drive shaft deforms said elastomeric ring and causes a deflection of said output drive flange with respect to said input drive flange, said drive fingers being free from contact with said input drive flange when said torque is below a predetermined level; and a plurality of snubber assemblies disposed on said input drive flange disk shaped portion, each said snubber assembly extending partially, circumferentially across one said angular gap, said snubber assembly comprising a bracket joined to said input drive flange disk shape portion, a snubber elastomer joined to said bracket and extending across said angular gap, and a contact plate joined to said snubber elastomer for making contact with one said drive finger, said snubber assembly being provided to transmit power from said input drive flange disk shaped portion to said output drive flange drive fingers when high torque causes a predetermined angular deformation of said elastomeric ring whereby said output drive flange drive fingers come into contact with said snubber assemblies.

2. The flexible coupling of claim 1 wherein one snubber assembly is provided for each of said annular gaps to allow unidirectional transmission of high torque through said snubber assemblies.

3. The flexible coupling of claim 2 wherein said engine and output drive shafts are hollow to allow mass transfer therethrough, said coupling further comprising a hollow, flexible spool assembly having a forward spool section, an elastomeric spool section, and an aft spool section, said forward spool section being sealed against the interior of said engine drive shaft, said aft spool section being sealed against the interior of said output drive shaft, and said elastomeric spool section being joined and sealed between said forward spool section and said aft spool section, said seals between said spool assembly and said engine drive shaft and said output drive shaft having a clearance fit to be substantially slidable in axial and rotational directions.

4. The flexible coupling of claim 1 wherein two snubber assemblies are provided for each of said annular gaps to allow bidirectional transmission of high torque through said snubber assemblies.

5. The flexible coupling of claim 4 wherein said engine and output drive shafts are hollow to allow mass transfer therethrough, said coupling further comprising a hollow, flexible spool assembly having a forward spool section, an elastomeric spool section, and an aft spool section, said forward spool section being sealed against the interior of said engine drive shaft, said aft spool section being sealed against the interior of said output drive shaft, and said elastomeric spool section being joined and sealed between said forward spool section and said aft spool section, said seals between said spool assembly and said engine drive shaft and said output drive shaft having a clearance fit to be substantially slidable in axial and rotational directions.

6. A flexible drive shaft coupling for connecting an engine drive shaft to an output drive shaft comprising:

an input drive flange having a centrally located hollow collar portion with a disk shaped portion formed integrally thereabout, said collar portion accepting and joining with said engine drive shaft to accept power from said engine drive shaft, said disk shaped portion having a forward face, an aft face, and a plurality of arcuate angular gaps therethrough positioned about said disk shaped portion and extending through said disk shaped portion from said forward face to said aft face;

a hollow, cylindrical outer ring having a forward end and a aft end, said forward end of said outer ring being affixed concentrically to said input drive flange disk shaped portion;

an elastomeric ring having a forward end and an aft end bonded concentrically within said outer ring, said elastomeric ring providing bending and flexibility between said engine drive shaft and said output drive shaft;

a hollow, cylindrical inner ring bonded concentrically inside said elastomeric ring;

an output drive flange having a centrally located hollow collar portion with a disk shaped portion formed integrally thereabout, and a plurality of drive fingers disposed on said output drive flange corresponding to said angular gaps in said input drive flange, said output drive flange fixed within said inner ring, said output drive flange collar portion accepting and joining with said output drive shaft, said drive fingers extending through said angular gaps and contacting said input drive flange disk shaped portion when torque from said engine drive shaft deforms said elastomeric ring and causes a deflection of said output drive flange with respect to said input drive flange, said drive fingers being free from contact with said input drive flange when said torque is below a predetermined level; and a plurality of snubber assemblies disposed on said input drive flange disk shaped portion, each said snubber assembly extending partially, circumferentially across one said angular gap, said snubber assembly comprising a bracket joined to said input drive flange disk shaped portion, a snubber elastomer joined to said bracket are extending across said angular gap, and a contact plate joined to said snubber elastomer for making contact with one said drive finger, said snubber assembly being provided to transmit power from said input drive flange disk shaped portion to said output drive flange drive fingers when high torque causes a predetermined angular deformation of said elastomeric ring whereby said output drive flange drive fingers come into contact with said snubber assemblies.

7. The flexible coupling of claim 6 wherein one snubber assembly is provided for each of said annular gaps to allow unidirectional transmission of high torque through said snubber assemblies.

8. The flexible coupling of claim 7 wherein said engine and output drive shafts are hollow to allow mass transfer therethrough, said coupling further comprising a hollow, flexible spool assembly having a forward spool section, an elastomeric spool section, and an aft spool section, said forward spool section being sealed against the interior of said engine drive shaft, said aft spool section being sealed against the interior of said output drive shaft, and said elastomeric spool section being joined and sealed between said forward spool section and said aft spool section transfer between said engine drive shaft and said output drive, said seals between said spool assembly and said engine drive shaft and said output drive shaft having a clearance fit to be substantially slidable in axial and rotational directions.

9. The flexible coupling of claim 6 wherein two snubber assemblies are provided for each of said annular gaps to allow bidirectional transmission of high torque through said snubber assemblies.

10. The flexible coupling of claim 9 wherein said engine and output drive shafts are hollow to allow mass transfer therethrough, said coupling further comprising a hollow, flexible spool assembly having a forward spool section, an elastomeric spool section, and an aft spool section, said forward spool section being sealed against the interior of said engine drive shaft, said aft spool section being sealed against the interior of said output drive shaft, and said elastomeric spool section being joined and sealed between said forward spool section and said aft spool section, said seals between said spool assembly and said engine drive shaft and said output drive shaft having a clearance fit to be substantially slidable in axial and rotational directions.

11. A flexible drive shaft coupling for connecting an engine drive shaft to an output drive shaft comprising:

an input drive flange having a centrally located hollow collar portion with a disk shaped portion formed integrally thereabout, said collar portion accepting and joining with said engine drive shaft to accept power from said engine drive shaft, said disk shaped portion having a forward face, an aft face, and a plurality of arcuate angular gaps therethrough positioned about said disk shaped portion and extending through said disk shaped portion from said forward face to said aft face;

a hollow, cylindrical outer ring having a forward and an aft end, said forward end of said outer ring being affixed concentrically to said input drive flange disk shaped portion;

an outer elastomeric ring having a forward end and an aft end bonded concentrically within said outer ring, said elastomeric ring providing bending and flexibility between said engine drive shaft and said output drive shaft;

a hollow, mounting cylinder bonded concentrically within said outer elastomeric ring and extending aft of said outer elastomeric ring;

an intermediate mass ring joined to said aft end of said mounting cylinder aft of said outer elastomeric ring for providing a rotational mass to alter the fundamental frequency of said coupling and reduce unwanted vibration to said output drive shaft;

an inner elastomeric ring having an open forward end and an open aft end bonded concentrically inside said mounting cylinder and oriented in the same direction as said outer elastomeric ring;

a hollow, cylindrical inner ring bonded concentrically inside said inner elastomeric ring;

an output drive flange having a centrally located hollow collar portion with a disk shaped portion formed integrally thereabout, and a plurality of drive fingers disposed on said output drive flange corresponding to said angular gaps in said input drive flange, said output drive flange fixed within said inner ring, said output drive flange collar portion accepting and joining with said output drive shaft, said drive fingers extending through said angular gaps and contacting said input drive flange disk shaped portion when torque from said engine drive shaft deforms said inner and outer elastomeric rings and causes a deflection of said output drive flange with respect to said input drive flange, said drive fingers being free from contact with said input drive flange when said torque is below a predetermined level; and a plurality of snubber assemblies disposed on said input drive flange disk shaped portion, each said snubber assembly extending partially, circumferentially across one said angular gap, said snubber assembly comprising a bracket joined to said input drive flange disk shaped portion, a snubber elastomer joined to said bracket and extending across said angular gap, and a contact plate joined to said snubber elastomer for making contact with one said drive finger, said snubber assembly being provided to transmit power from said input drive flange disk shaped portion to said output drive flange drive fingers when high torque causes a predetermined angular deformation of said elastomeric rings wherein said output drive flange drive fingers come into contact with said snubber assemblies.

12. The flexible coupling of claim 11 wherein one snubber assembly is provided for each of said annular gaps to allow unidirectional transmission of high torque through said snubber assemblies.

13. The flexible coupling of claim 12 wherein said engine and output drive shafts are hollow to allow mass transfer therethrough, said coupling further comprising a hollow, flexible spool assembly having a forward spool section, an elastomeric spool section, and an aft spool section, said forward spool section being sealed against the interior of said engine drive shaft, said aft spool section being sealed against the interior of said output drive shaft, and said elastomeric spool section being joined and sealed between said forward spool section and said aft spool section, said seals between said spool assembly and said engine drive shaft and said output drive shaft having a clearance fit to be substantially slidable in axial and rotational directions.

14. The flexible coupling of claim 11 wherein two snubber assemblies are provided for each of said annular gaps to allow bidirectional transmission of high torque through said snubber assemblies.

15. The flexible coupling of claim 14 wherein said engine and output drive shafts are hollow to allow mass transfer therethrough, said coupling further comprising a hollow, flexible spool assembly having a forward spool section, an elastomeric spool section, and an aft spool section, said forward spool section being sealed against the interior of said engine drive shaft, said aft spool section being sealed against the interior of said output drive shaft, and said elastomeric spool section being joined and sealed between said forward spool section and said aft spool section, said seals between said spool assembly and said engine drive shaft and said output drive shaft having a clearance fit to be substantially slidable in axial and rotational directions.

* * * * *